US007116551B2

(12) United States Patent
Erickson et al.

(10) Patent No.: US 7,116,551 B2
(45) Date of Patent: Oct. 3, 2006

(54) AUTOMATIC DRIVE SECURING APPARATUS

(75) Inventors: Vernon D. Erickson, Dakota Dunes, SD (US); David R. Davis, Jefferson, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/645,683

(22) Filed: Aug. 21, 2003

(65) Prior Publication Data

US 2005/0041388 A1    Feb. 24, 2005

(51) Int. Cl.
*H05K 5/00* (2006.01)

(52) U.S. Cl. .............. 361/685; 312/223.1; 361/683

(58) Field of Classification Search ............ 360/97.01, 360/98.01, 137, 137 D; 361/685, 796, 797, 361/798, 801, 759, 732, 740, 683; 312/9.36, 312/265.5, 265.6, 223.1; 248/220.31, 500, 248/581
See application file for complete search history.

(56) References Cited

U.S. PATENT DOCUMENTS

| 6,125,031 | A |  | 9/2000 | Della Fiora et al. |
| 6,227,516 | B1 |  | 5/2001 | Webster, Jr. et al. |
| 6,337,793 | B1 | * | 1/2002 | Vier et al. .................. 361/683 |
| 6,366,457 | B1 |  | 4/2002 | Otto et al. |
| 6,388,875 | B1 |  | 5/2002 | Chen |

* cited by examiner

*Primary Examiner*—Lisa Lea-Edmonds
*Assistant Examiner*—Zachary Pape
(74) *Attorney, Agent, or Firm*—Jeffrey A. Proehl; Woods Fuller Shultz & Smith

(57) ABSTRACT

The present invention is directed to an apparatus for securing an electronic component in a chassis. The apparatus includes a frame including a pair of spaced apart brackets for accepting a component therein. A securing device is mounted to at least one of the frame and a cover for providing access to the internal components. Suitable securing devices include a biased pin, and a generally arcuate lever including a pin or protrusion extending therefrom. The securing device and cover are arranged and configured such that the securing device engages an accepted component when the cover is secured to the frame and the device is released from the component when the cover is opened, therefore facilitating manufacture and repair.

14 Claims, 7 Drawing Sheets

AUTOMATIC DRIVE SECURING APPARATUS

FIELD OF THE INVENTION

The present invention generally relates to the field of electronics and particularly to an apparatus for restraining a sliding component in a chassis.

BACKGROUND OF THE INVENTION

Electronic devices are configured to accept a wide variety of components. The ability to accept a wide range of electronic components allows for greater standardization, which may reduce manufacturing costs, thus allowing high quality products while minimizing cost. For example, computer manufacturers wish to utilize chassis capable of accepting a wide variety of components, such as drives (i.e., floppy drives, hard drives, CD ROM drives, DVD drives), and the like within an electronic device chassis. Manufacturing concerns must also be balanced with user demands. For instance, a user may wish to have the ability to upgrade media drives, minimize the effort required to replace a damaged or defective component, and the like. In order to accommodate both manufacturing and consumer demands, devices utilized to assemble the components into a working device should be cost effective, minimize the effort required to assemble or exchange constituent parts, and allow intuitive assembly.

Consistently, electronic device manufacturers, and in particular computer manufacturers, need to restrain components securely within a chassis. Typically, manufacturers rely on thumb screw type fasteners to positively secure components in the chassis. Drawbacks to the use of screws include the additional labor or machinery needed to secure the screw, screws may become lost, be difficult to secure and the like (both for manufacturers and consumers alike).

Therefore, it would be desirable to provide an apparatus for automatically securing an electronic component in a chassis without the need for a screw-type fastener.

SUMMARY OF THE INVENTION

Accordingly, the present invention is directed to an apparatus for providing automatic securing/unsecuring of an electronic component in a chassis. The system of the present invention allows for efficient securing of a component while a cover is closed while promoting efficient manufacturing and repair by automatically releasing the securing mechanism when the cover is opened or removed.

In an aspect of the present invention, an apparatus for securing a component includes a frame including a pair of spaced apart brackets. A securing device is mounted to at least one of the frame and a cover for providing access to the internal components. Suitable securing devices include a biased pin and a generally arcuate lever including a pin or protrusion extending therefrom. The securing device and cover are arranged and configured such that the securing device engages an accepted component when the cover is secured to the frame and the device is released from the component when the cover is opened, therefore facilitating manufacture and repair.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 5B, exemplary embodiments of the present invention are shown wherein an apparatus for providing automatic securing of an electronic component included in an electronic device chassis is disclosed. The apparatus of the present invention allows for efficient positive securing of an electronic component in a chassis while minimizing cost, allowing efficient manufacture and repair. The apparatus of the present invention permits effective securing of an accepted device in the chassis while eliminating the necessity for a thumb screw, additional chassis components, and the like.

Figure 1:
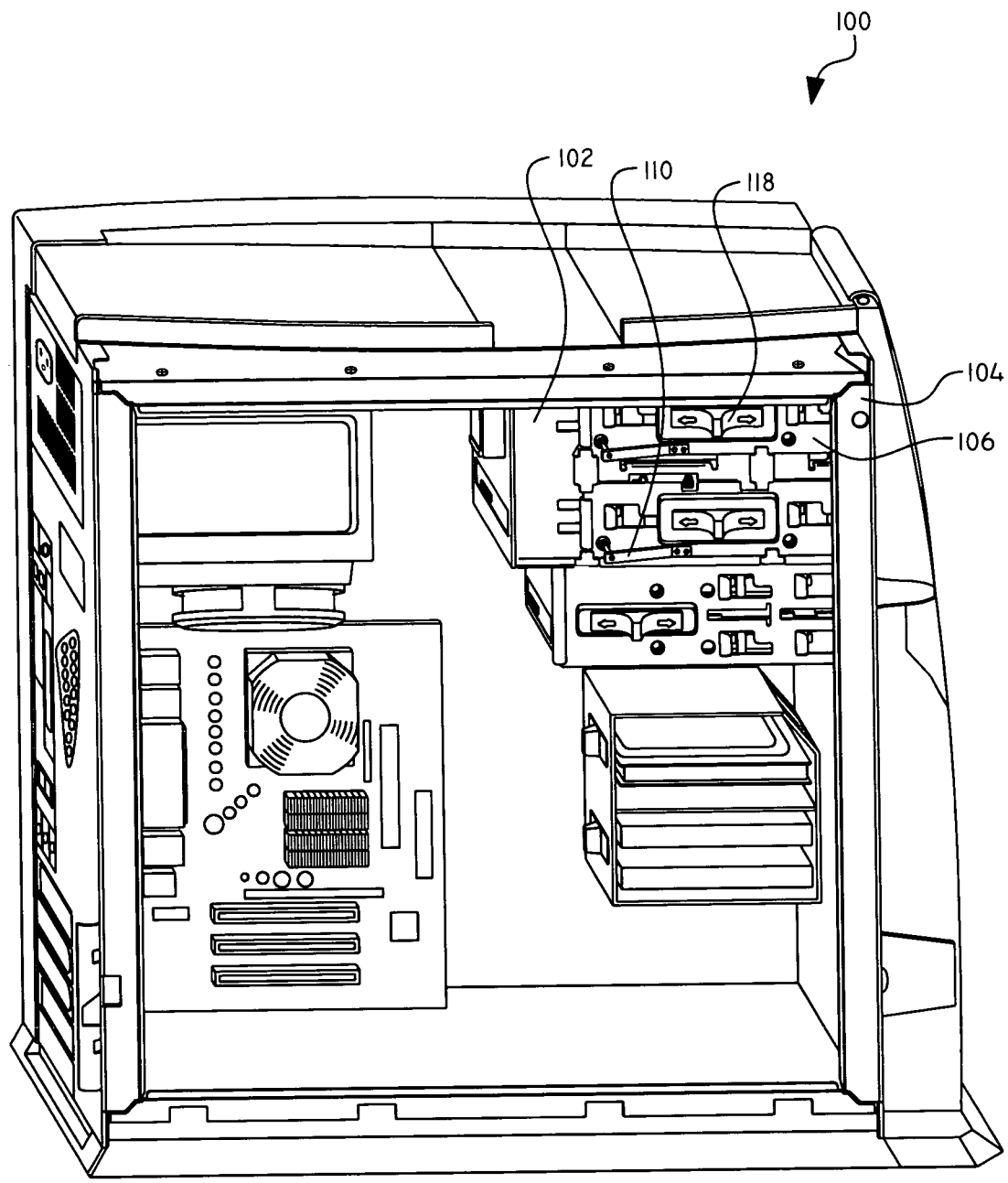
FIG. 1 is a side view of an apparatus of the present invention including a lever type securing device.

Referring to FIG. 1, an apparatus 100 for securing an electronic component is described. The apparatus 100 includes a frame 102. In the present embodiment, the frame 102 is formed as a sub-frame assembly of a chassis 104 for containing a computer. In further embodiments, the frame 102 may be formed integrally with the chassis 104. The frame 102 includes a pair of spaced apart brackets 106. The spaced apart brackets 106 may form generally opposing sides of the frame 102. For instance, the brackets are configured to accept an electronic component therein. In further examples, the frame 102 is arranged to accept a component slidingly received between the brackets 106. Sliding reception of a component allows for secure mounting and may reduce the size of the apertures required through the chassis/bezel cover.

Electronic components may include drives, such as removable media drives (i.e., a floppy drive, a CD ROM drive, a DVD drive, an optical/magnetic based drives), hard drives, as well as other electronic device constituent components, such as components forming a computer and the like for retention in a chassis. For instance, the present invention may be employed with various electronic devices such as copiers, consumer electronics and the like.

Frame brackets may be formed as individual rails extending substantially parallel to the opposing bracket, or the frame/brackets may be formed unitarily such as from a stamped sheet of material configured into a cage (frame) for accepting a component therein. For instance, the brackets may be formed to include a channel recessed, towards an accepted component, in the frame for receiving a corresponding extension included in a component. In the previous example, the channel is formed on the interior of the frame proximal to a component, for guiding the component.

Figure 2:
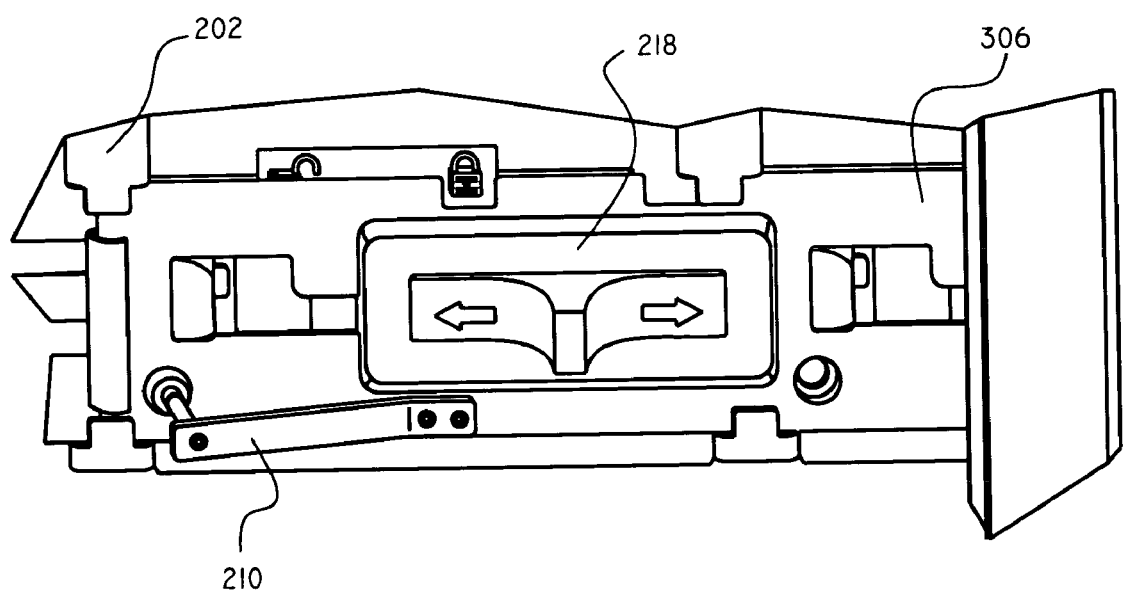
FIG. 2 is an enlarged cut-away view of a lever type securing device.
Figure 3A:
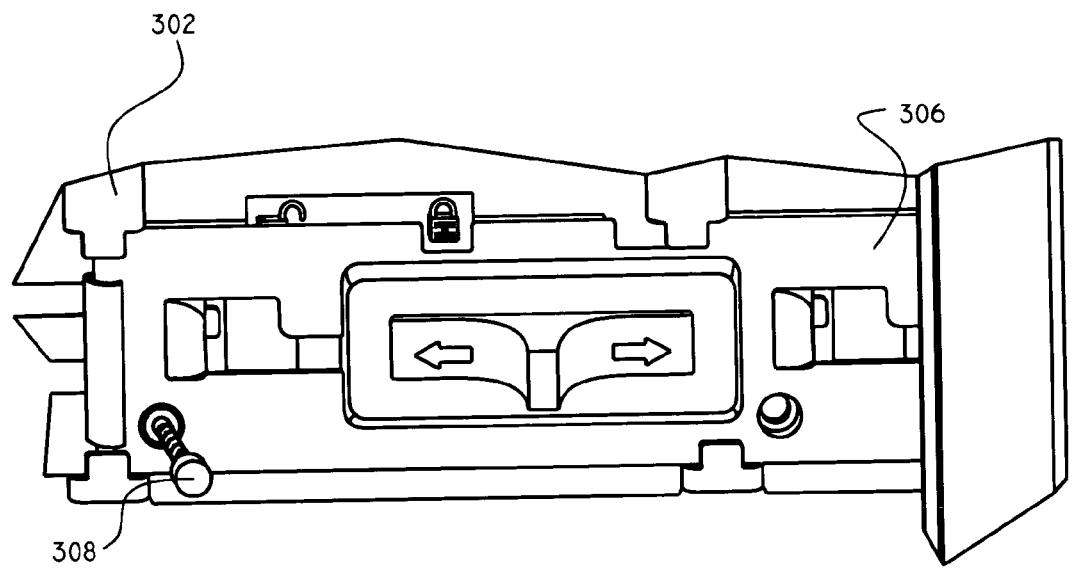
FIG. 3A is an enlarged cut-away view of a biased pin type securing device of the present invention.
Figure 3B:
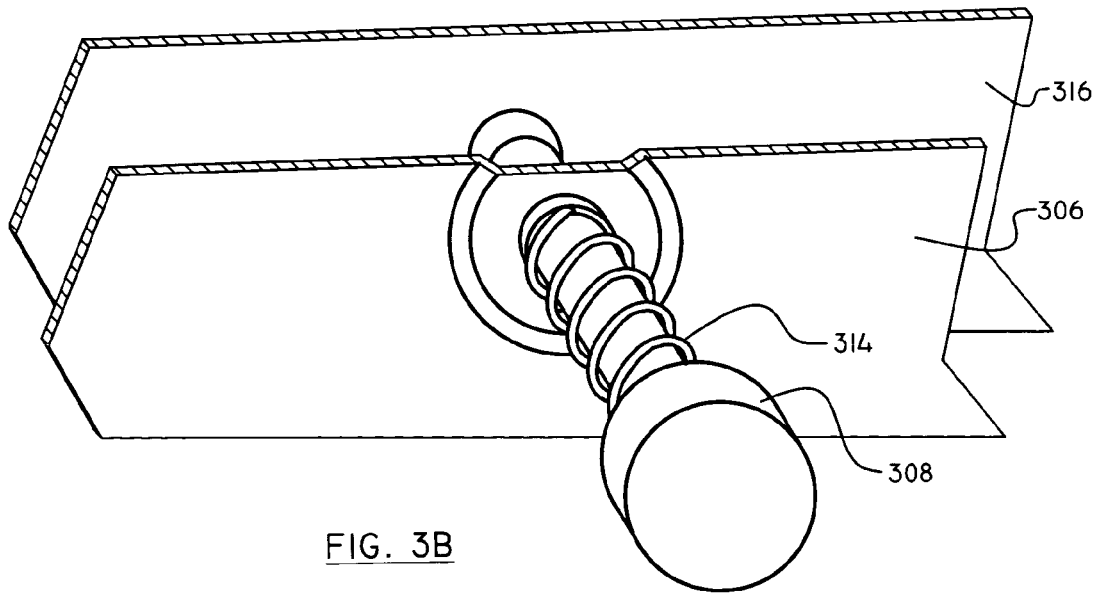
FIG. 3B is a cut-away view of a biased pin type securing device of the present invention for engaging with an aperture included in a received component.

As may be seen in FIGS. 3A and 3B, a securing device is mounted to at least one of the frame 302 and a cover. In a present aspect of the invention, the securing device is a biased pin 308 mounted to the frame 302. Referring to FIGS. 1 and 2, in a further embodiment, the securing device is a lever 110 including a protrusion or pin extending therefrom. A lever may be configured as a generally arcuate lever so as to spring away from engagement with the component, such as when a cover is removed. A lever may be formed of metal, of a sufficiently flexible plastic, or the like for permitting flexing. Preferably, a securing device is biased into a disengagement from the accepted electronic component.

Referring again to FIGS. 3A and 3B, the pin 308 extends through an aperture in the frame 102 into a corresponding recess or aperture included in an accepted drive 316. For example, the pin 308 is tapered to allow easy securing of the component. Preferably, the biased pin is disposed generally perpendicularly to the direction to which a component is slid into the frame so as to prevent longitudinal movement along a received direction. In an aspect of present embodiment, the pin is biased by a coiled capture spring 314. This arrangement is preferred because the configuration of the brackets/biased pin may prevent movement of the component within the chassis. In advantageous embodiments, a pin is biased generally into a released or disengaged position towards an access opening in the chassis/access cover so that securing of the cover overcomes the biasing tendency to engage the pin with the drive.

Figure 4A:
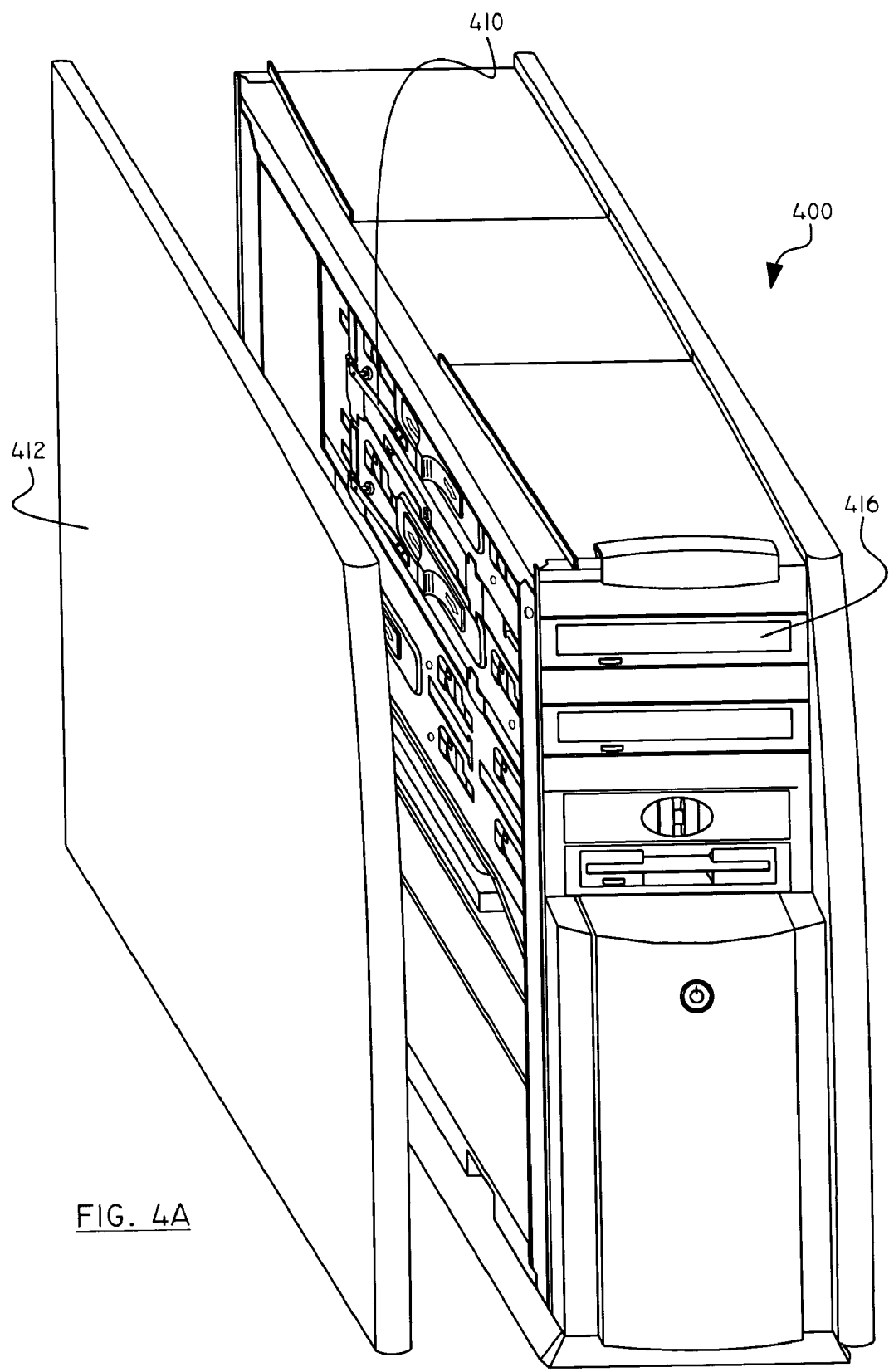
FIG. 4A is a perspective view of an apparatus of the present invention including a lever type securing device for automatically securing an accepted component upon securing a cover.
Figure 4B:
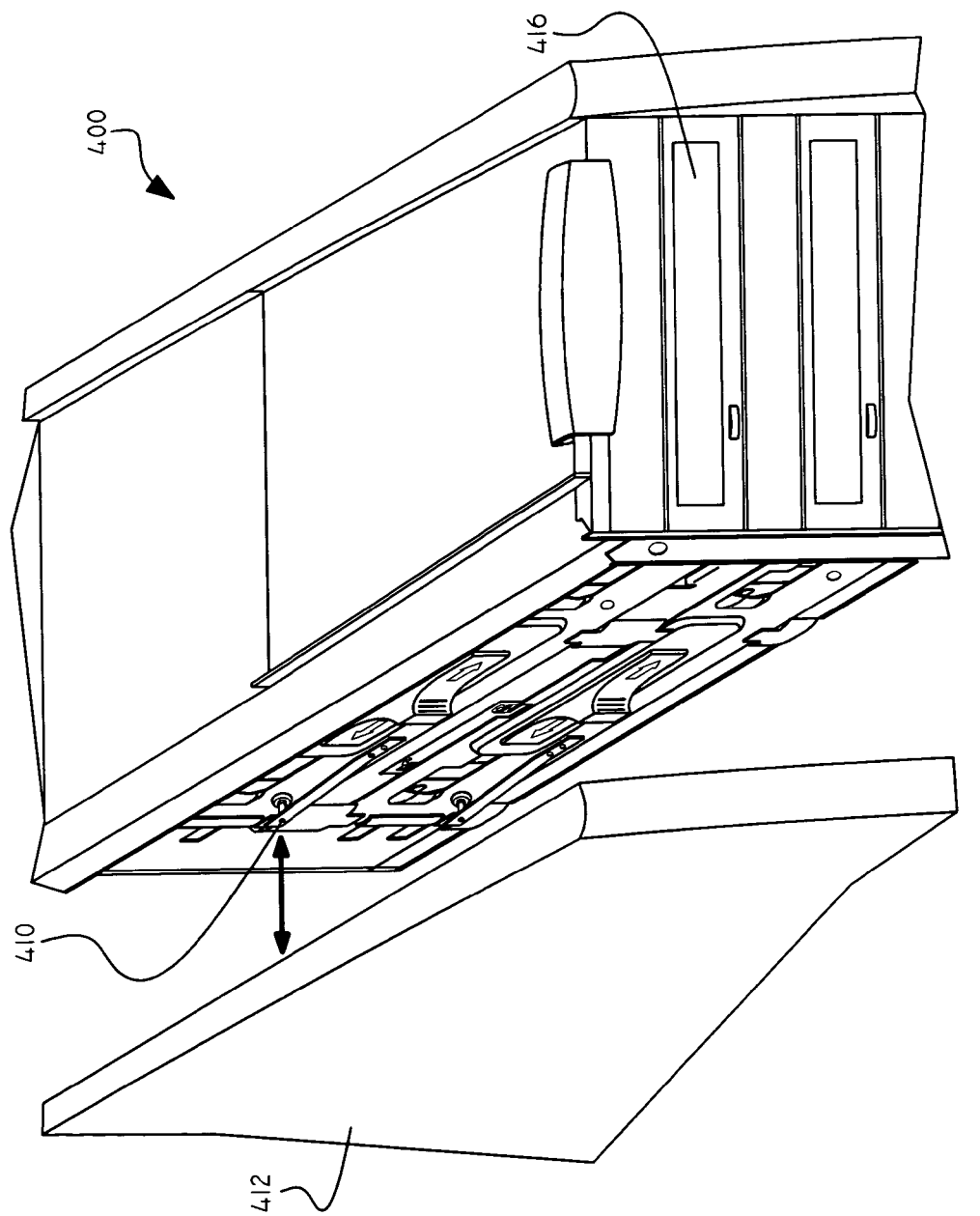
FIG. 4B is a perspective view illustrating automatic engagement/releasing of an accepted component upon opening/closing of a cover by a lever type securing device of the present invention.

As may be best seen in FIGS. 4A and 4B, a cover 412 is included in an apparatus 400. For example, a removable chassis cover is implemented (mounted via pseudo hinges, such as hooks, interlocking mechanical structures or the like for providing a removable connection) to prevent the ingress of dust, debris, as well as shielding the internal electronic components when engaged with the frame. In further embodiments, the cover may be attached via a hinge or a series of hinges along a side such as to the frame/chassis. When operated, the cover 412 and the securing device, in the present embodiment a lever-type securing device 410 is utilized, are arranged and configured to cause the securing device to engage the component when the cover is in place, or secured. When the cover is removed or released the securing device may automatically release. Thus operation of the cover may result in the engaging/disengaging of the securing device with respect to the component.

Referring to FIG. 1, in further embodiments, the frame 102 may include additional structures for mating with a received component. For example, a slide lock device 118 is utilized to capture a tab, engage a recess or aperture included in the component's housing, frictionally engage an accepted component, and the like as contemplated by one of ordinary skill in the art.

Figure 5A:
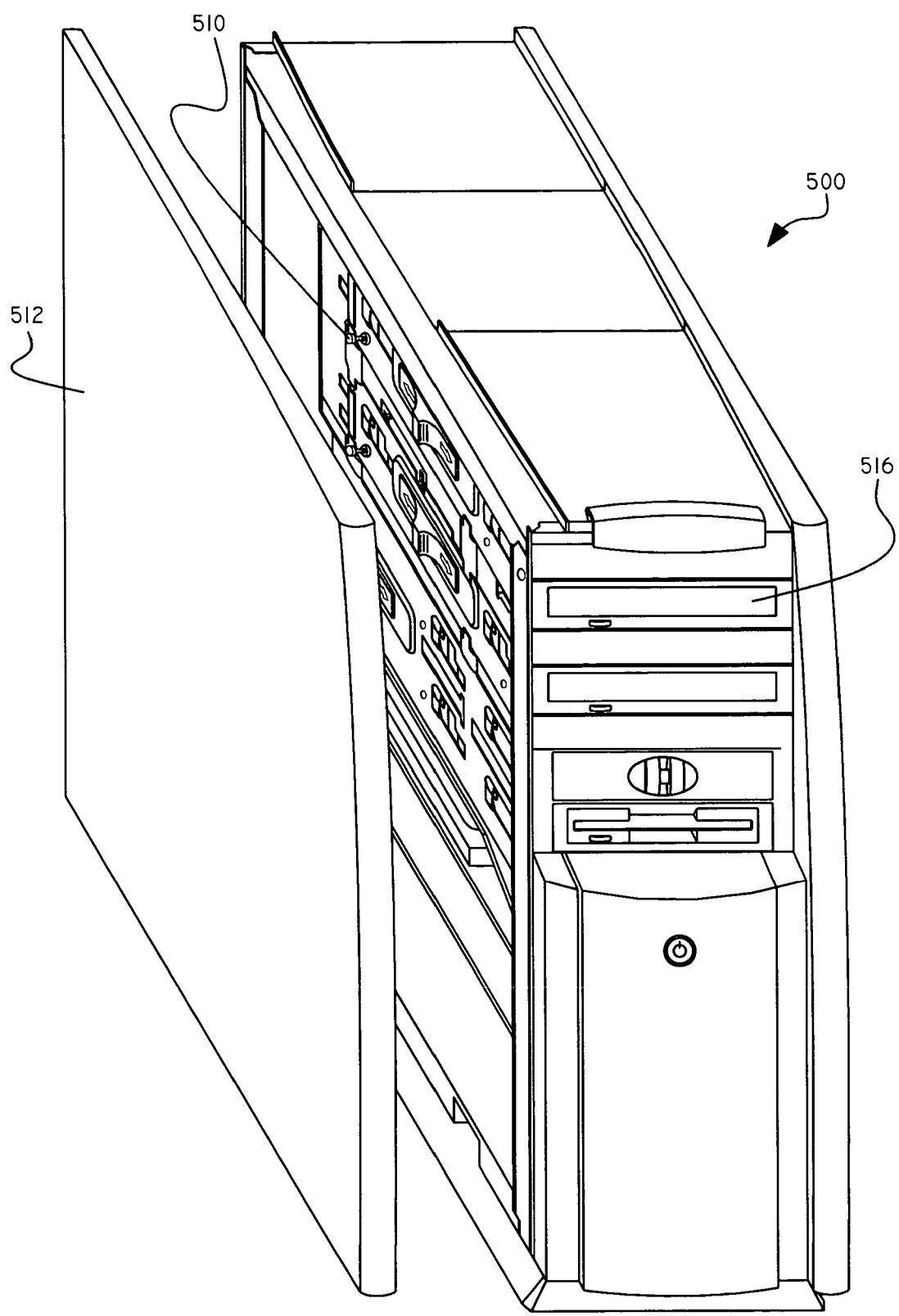
FIG. 5A is a perspective view of an apparatus of the present invention including a biased pin type securing device for automatically securing an accepted component upon securing a cover.
Figure 5B:
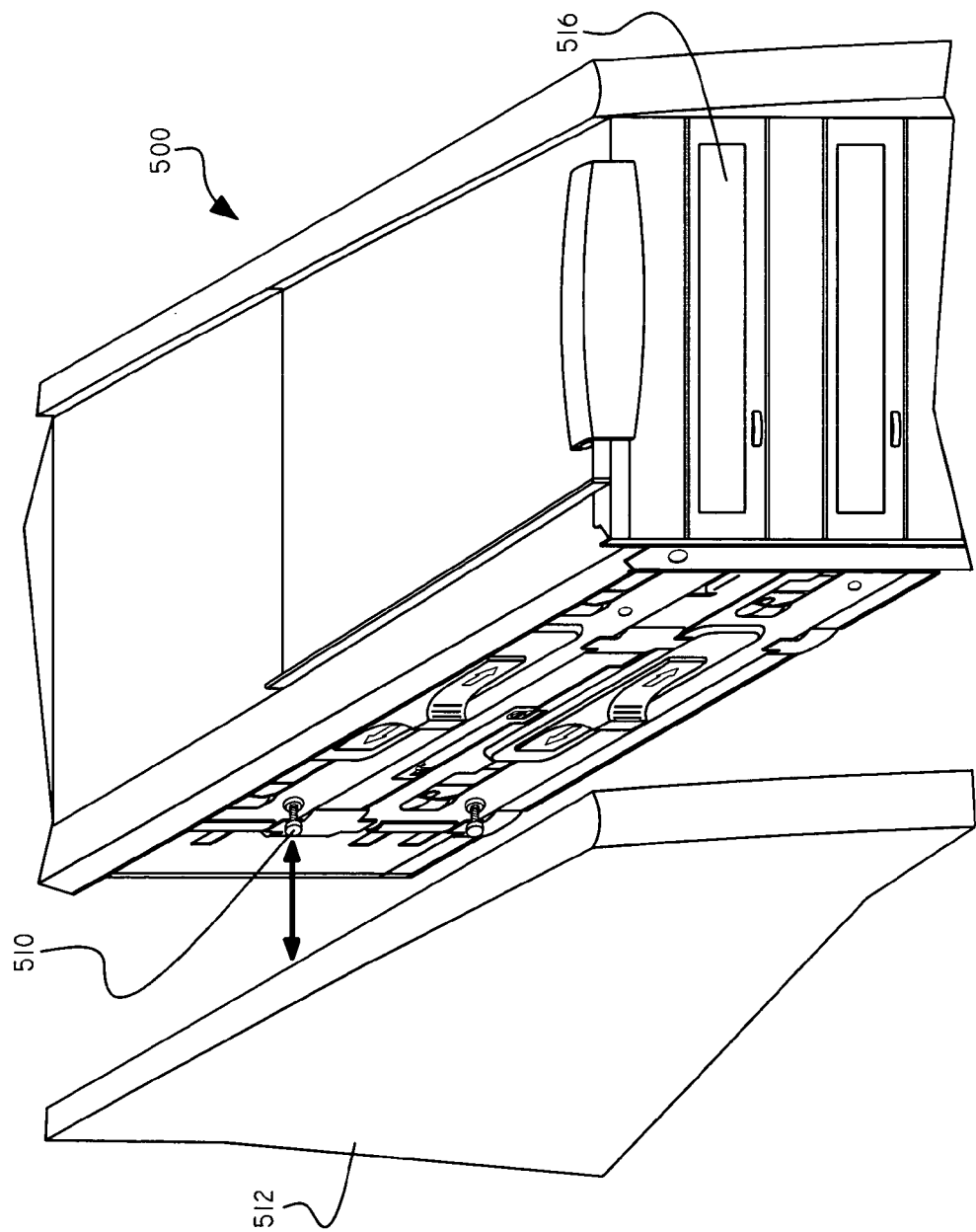
FIG. 5B is a perspective view illustrating automatic engagement/releasing of an accepted component upon opening/closing of a cover by a biased pin type securing device of the present invention.

Referring now to FIGS. 5A and 5B in a further exemplary embodiment a spring biased pin 510 securing device is utilized to automatically engage/release an accepted component such as a DVD media drive 516. The biased pin is suitably arranged so as to engage an aperture in the drive in much the same fashion as described for the lever type securing device. Furthermore, the apparatus of the present embodiment allows for positive securing of the drive, thus, preventing the drive 516 from sliding out of the chassis through the aperture in the front bezel cover when the cover is secured with the frame/chassis.

It is believed that the apparatus of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for securing an electronic component within a chassis, comprising:
    a frame including a pair of spaced apart brackets for accepting an electronic component therein;
    a cover connected to the frame, said cover being configured so as to permit access to the accepted electronic component; and
    a securing device mounted to at least one of the frame and the cover, for engaging the accepted electronic component within the frame;
    wherein the securing device is configured so that closing the cover automatically causes the securing device to engage the accepted electronic component; and
    wherein the securing device is biased toward a position that disengages the securing device from the accepted electronic component such that opening the cover releases the securing device from engagement with the accepted electronic component;
    wherein the securing device is a generally arcuate lever including a protrusion for engaging the accepted electronic component.

2. The apparatus of claim 1, wherein the securing device extends through the frame into engagement with a corresponding structure included in the accepted electronic component.

3. The apparatus of claim 1, wherein the cover is a removable panel cover.

4. The apparatus of claim 1, wherein the cover is a rotating panel door.

5. The apparatus of claim 1, wherein the accepted electronic component is a drive.

6. An apparatus for securing an electronic component within a chassis, comprising:
    a frame including a pair of spaced apart brackets for accepting an electronic component therein;
    a cover connected to the frame, said cover being configured so as to permit access to the accepted electronic component; and
    a securing device mounted to at least one of the frame and the cover, for engaging the accepted electronic component within the frame;

wherein the securing device is configured so that closing the cover automatically causes the securing device to engage the accepted electronic component; and wherein the securing device is biased toward a position that disengages the securing device from the accepted electronic component such that opening the cover releases the securing device from engagement with the accepted electronic component;

wherein the securing device is a biased pin for engaging the accepted electronic component;

wherein the biased pin is biased by a captured coil spring configured and arranged so as to disengage upon opening the cover.

7. An apparatus for securing an electronic component, comprising:

a frame including a pair of spaced apart brackets for slidingly accepting an electronic component therein;

a cover connected to the frame being configured so as to permit access to the accepted electronic component; and a securing device mounted to the frame, for engaging the accepted electronic component within the frame;

wherein operation of the cover automatically causes the securing device to engage the accepted electronic component upon closing the cover and release the securing device from engagement upon opening the cover;

wherein the securing device is a spring lever including a protrusion for engaging the accepted electronic component.

8. The apparatus of claim 7, wherein the securing device extends through the frame into engagement with a corresponding structure included in the accepted electronic component.

9. The apparatus of claim 7, wherein the cover is a removable panel cover.

10. The apparatus of claim 7, wherein the cover is a rotating panel door.

11. The apparatus of claim 7, wherein the accepted electronic component is a drive.

12. The apparatus of claim 7, wherein the accepted electronic component is selected from the group consisting of: a floppy drive, a Digital Video Disc drive, a hard drive, an optical drive, and a CD ROM drive.

13. An apparatus for securing an electronic component within a chassis, comprising:

a frame including a pair of spaced apart brackets for slidingly accepting an electronic component therein;

a cover mounted to the frame being configured so as to permit access to the accepted electronic component; and means for securing the accepted electronic component in the frame;

wherein the securing means automatically engages the accepted electronic component upon closing the cover and release the securing device from engagement upon opening the cover;

wherein the securing means is at least one of a spring lever including a protrusion for engaging the accepted electronic component and a biased pin for engaging the accepted electronic component.

14. The apparatus of claim 13, wherein the accepted electronic component is a drive.

* * * * *